(12) United States Patent
Lee et al.

(10) Patent No.: US 9,369,194 B2
(45) Date of Patent: *Jun. 14, 2016

(54) PROCESSING UPLINK SIGNAL AND DOWNLINK SIGNAL IN RADIO UNIT

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,306

(22) Filed: Jul. 16, 2014

(65) Prior Publication Data

US 2014/0328224 A1     Nov. 6, 2014

Related U.S. Application Data

(63) Continuation of application No. 13/570,312, filed on Aug. 9, 2012, now Pat. No. 8,867,432.

(30) Foreign Application Priority Data

Aug. 9, 2011    (KR) .................. 10-2011-0079271

(51) Int. Cl.
*H04L 1/00*      (2006.01)
*H04B 7/155*     (2006.01)
*H04W 16/26*     (2009.01)

(52) U.S. Cl.
CPC ........ *H04B 7/15542* (2013.01); *H04B 7/15592* (2013.01); *H04W 16/26* (2013.01)

(58) Field of Classification Search
CPC .. H04B 7/2606; H04B 7/2607; H04B 7/2608; H04B 7/2609; H04B 7/261; H04J 1/10; H04J 3/08; H04L 5/04
USPC .................. 370/274, 379, 315–327, 492, 501
See application file for complete search history.

(56) References Cited

U.S. PATENT DOCUMENTS

| 5,864,760 A | 1/1999 | Gilhousen et al. |
| 6,081,714 A | 6/2000 | Wakizaka |

(Continued)

FOREIGN PATENT DOCUMENTS

| KR | 10-0304781 B1 | 9/2001 |
| KR | 10-2005-0068400 A | 7/2005 |

(Continued)

OTHER PUBLICATIONS

ETSI TS 123 272 V8.1.0, "Digital cellular telecommunications system (Phase 2+); Universal Mobile Telecommunications System (UMTS); Circuit Switched (CS) fallback in Evolved Packet System (EPS); Stage 2", ETSI, Nov. 2008, pp. 1-47.

(Continued)

*Primary Examiner* — Dady Chery
(74) *Attorney, Agent, or Firm* — IP Legal Services, LLC

(57) ABSTRACT

Described embodiments provide a method for processing an uplink signal in a radio unit. A first uplink signal may be received directly from user equipment. The received uplink signal may be delayed using uplink delay information. A second uplink signal may be received indirectly from user equipment through at least one repeater connected to the radio unit. The delayed first uplink signal and the second uplink signal may be combined and transmitted to a digital unit.

16 Claims, 5 Drawing Sheets

(56) References Cited

U.S. PATENT DOCUMENTS

| | | |
|---|---|---|
| 6,466,790 B2 | 10/2002 | Haumont et al. |
| 6,526,028 B1 | 2/2003 | Kondo |
| 6,728,919 B1 | 4/2004 | Kondo et al. |
| 6,845,238 B1 | 1/2005 | Muller |
| 6,975,604 B1 | 12/2005 | Ishida et al. |
| 7,072,655 B2 | 7/2006 | Ikeda et al. |
| 7,200,403 B2 | 4/2007 | Hamabe |
| 7,796,514 B2 | 9/2010 | Noriega |
| 8,045,926 B2 | 10/2011 | Martikkala et al. |
| 8,149,895 B2 | 4/2012 | Bolourchi et al. |
| 8,165,089 B2 | 4/2012 | Jung et al. |
| 8,379,567 B2 | 2/2013 | Cho et al. |
| 8,406,193 B2 | 3/2013 | Cho et al. |
| 8,446,869 B2 | 5/2013 | Lee et al. |
| 8,472,921 B2 | 6/2013 | Yang et al. |
| 8,509,783 B2 | 8/2013 | Iwamura |
| 8,868,086 B2 | 10/2014 | Lee et al. |
| 2001/0011019 A1 | 8/2001 | Jokimies |
| 2004/0203926 A1 | 10/2004 | Ruutu et al. |
| 2004/0235510 A1 | 11/2004 | Elicegui et al. |
| 2005/0048980 A1 | 3/2005 | Kumar et al. |
| 2005/0249322 A1 | 11/2005 | Gerlach |
| 2006/0092872 A1 | 5/2006 | Lee et al. |
| 2006/0178153 A1 | 8/2006 | Tenny et al. |
| 2007/0087689 A1 | 4/2007 | Alles et al. |
| 2007/0184841 A1 | 8/2007 | Choi et al. |
| 2008/0139204 A1 | 6/2008 | Hsieh et al. |
| 2008/0199183 A1 | 8/2008 | Liu et al. |
| 2008/0219222 A1 | 9/2008 | Lo et al. |
| 2009/0135778 A1 | 5/2009 | Lee et al. |
| 2009/0238143 A1 | 9/2009 | Mukherjee et al. |
| 2009/0291632 A1* | 11/2009 | Braithwaite ....... H04B 7/15585 455/7 |
| 2009/0310568 A1 | 12/2009 | Chen et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0113032 A1 | 5/2010 | Lee et al. |
| 2010/0136979 A1 | 6/2010 | Yang et al. |
| 2010/0144334 A1 | 6/2010 | Gorokhov et al. |
| 2010/0178916 A1 | 7/2010 | Jamadagni |
| 2010/0216474 A1 | 8/2010 | Park et al. |
| 2010/0273485 A1 | 10/2010 | Huang et al. |
| 2010/0278146 A1 | 11/2010 | Aoyama et al. |
| 2010/0278150 A1 | 11/2010 | Park et al. |
| 2011/0013560 A1 | 1/2011 | Zhang et al. |
| 2011/0016214 A1 | 1/2011 | Jackson |
| 2011/0022812 A1 | 1/2011 | van der Linden et al. |
| 2011/0092214 A1 | 4/2011 | Iwamura |
| 2011/0176477 A1 | 7/2011 | Lee et al. |
| 2011/0176485 A1 | 7/2011 | Pudney et al. |
| 2011/0207459 A1 | 8/2011 | Ramasamy et al. |
| 2011/0237272 A1 | 9/2011 | Gorokhov et al. |
| 2011/0274040 A1 | 11/2011 | Pani et al. |
| 2011/0300887 A1 | 12/2011 | Osterling |
| 2011/0312355 A1 | 12/2011 | Cheng et al. |
| 2012/0039216 A1 | 2/2012 | Li et al. |
| 2012/0221683 A1 | 8/2012 | Ferris |
| 2012/0322477 A1 | 12/2012 | Kang et al. |
| 2013/0089021 A1 | 4/2013 | Gaal et al. |
| 2013/0103844 A1 | 4/2013 | Bulut et al. |
| 2013/0163416 A1 | 6/2013 | Lee et al. |
| 2013/0242951 A1 | 9/2013 | Lee et al. |
| 2014/0052864 A1 | 2/2014 | Van Der Linden et al. |

FOREIGN PATENT DOCUMENTS

| | | |
|---|---|---|
| KR | 10-2005-0121136 A | 12/2005 |
| KR | 10-2006-0016016 A | 2/2006 |
| KR | 10-2006-0040237 A | 5/2006 |
| KR | 10-2007-0079633 A | 8/2007 |
| KR | 10-2007-0110348 A | 11/2007 |
| KR | 10-2008-0026855 A | 3/2008 |
| KR | 10-2008-0041543 A | 5/2008 |
| KR | 10-2008-0041545 A | 5/2008 |
| KR | 10-2008-0064691 A | 7/2008 |
| KR | 10-2008-0080801 A | 9/2008 |
| KR | 10-0873386 B1 | 12/2008 |
| KR | 10-2009-0034261 A | 4/2009 |
| KR | 10-2009-0073443 A | 7/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0035088 A | 4/2010 |
| KR | 10-2010-0048841 A | 5/2010 |
| KR | 10-2010-0060353 A | 6/2010 |
| KR | 10-2010-0066875 A | 6/2010 |
| KR | 10-2010-0087382 A | 8/2010 |
| KR | 10-2010-0092742 A | 8/2010 |
| KR | 10-0976943 B1 | 8/2010 |
| KR | 10-2010-0126776 A | 12/2010 |
| KR | 10-2010-0126818 A | 12/2010 |
| KR | 10-2010-0133821 A | 12/2010 |
| KR | 10-1030897 B1 | 4/2011 |
| KR | 10-2011-0094140 A | 8/2011 |
| KR | 10-2011-0097702 A | 8/2011 |
| KR | 10-2011-0109327 A | 9/2011 |
| WO | 2008/110924 A2 | 9/2008 |
| WO | 2010/068769 A1 | 6/2010 |
| WO | 2010/123270 A2 | 10/2010 |
| WO | 2010/127365 A1 | 11/2010 |
| WO | 2011/022733 A2 | 2/2011 |

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

* cited by examiner

PROCESSING UPLINK SIGNAL AND DOWNLINK SIGNAL IN RADIO UNIT

CROSS REFERENCE TO PRIOR APPLICATIONS

The present application is continuation application of U.S. patent application Ser. No. 13/570,312 (filed on Aug. 9, 2012), which claims priority under 35 U.S.C. §119 to Korean Patent Application No. 10-2011-0079271 (filed on Aug. 9, 2011), which is hereby incorporated by reference in its entirety.

The subject matter of this application is related to U.S. patent application Ser. No. 13/326,734 filed Dec. 15, 2011, the teachings of which are incorporated herein their entirety by reference.

FIELD OF THE INVENTION

The present invention relates to communications and, in particular, to processing uplink signals and downlink signals in a radio unit.

BACKGROUND OF THE INVENTION

A cloud communication center network technology has been introduced to more efficiently utilize network resources. The cloud communication center network technology may greatly reduce operational expenditure and power consumption while increasing radio data capacity. Due to such advantages, the cloud communication center network technology has attracted much attention. Such a cloud communication center network technology may be referred to as a virtual radio network technology.

Typically, a radio unit and a digital unit are implemented as single equipment and installed at a base station. The digital unit is connected to a switching system located at a central office, the radio unit transmits and receives a radio signal to/from a user equipment, and the digital unit processes the radio signal in accordance with an open system interconnection model (OSI) such as a radio Internet protocol.

Unlike the typical base station equipment, a cloud communication center network includes a digital unit and a radio unit that are separate and generally installed at different locations. The cloud communication center network may be referred to as a virtual radio network. For example, a radio unit may be installed at a base station in a respective target service area, and a plurality of digital units may be centralized in a digital unit center at a central office with a switching system. The radio unit may be coupled to a corresponding one of the digital units in the digital unit center through an optical interface. The radio unit may be coupled to repeaters. The radio unit may be coupled to one repeater or multiple repeaters. Such repeaters may deliver signals from user equipment to the radio unit and/or from the radio unit to the user equipment.

An orthogonal frequency division multiplexing (OFDM) technology has been employed in communication networks. The OFDM technology may use multiple paths for transmitting and receiving signals so inter-carrier interference and inter-symbol interference may be generated. In order to prevent such inter-carrier interference and inter-symbol interference, a guard interval is added between active symbol periods and a cyclic prefix is transmitted during the guard interval. When related signals arrive within one cyclic prefix, inter-carrier interference and inter-symbol interference are not generated so as to restore an original signal by combining related signals.

As described, a radio unit may be coupled to a plurality of repeaters. Such a radio unit may receive signals from a digital unit, process the received signal, and transmit the processed signals to user equipment. When the radio unit transmits signals to user equipment, the radio unit may transmit directly to the user equipment and/or indirectly to the user equipment through at least one repeater. Due to the OFDM, related signals may need to arrive at the user equipment within one cyclic prefix in order to enable the user equipment to restore an original signal without inter-symbol interference and inter-carrier interference. Due to the repeaters, signals indirectly delivered to the user equipment may be delayed.

Similarly, user equipment may transmit signals directly to a radio unit and/or indirectly to the radio unit through at least one repeater. Such signals may need to arrive at the radio unit within one cyclic prefix in order to enable the radio unit to combine the received related signal without inter-symbol interference and inter-carrier interference. Due to the repeaters, signals indirectly delivered to the radio unit may be delayed.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, uplink signals may be synchronized based on information on associated repeaters in a virtual radio network.

In accordance with another aspect of the present invention, downlink signals may be synchronized based on information on associated repeaters in a virtual radio network.

In accordance with another aspect of the present invention, signals directly delivered from a radio unit to user equipment may be delayed in the radio unit based on information on repeaters in a virtual radio network.

In accordance with still another aspect of the present invention, signals directly delivered from user equipment to a radio unit may be delayed based on information on repeaters in a virtual radio network.

In accordance with an embodiment of the present invention, a method may be provided for processing an uplink signal. The method may include receiving a first uplink signal directly from user equipment, delaying the received first uplink signal by using uplink delay information, receiving a second uplink signal indirectly from user equipment through at least one repeater connected to a radio unit, combining the delayed first uplink signal and the second uplink signal, and transmitting the combined signal to a digital unit.

The method may further include receiving the uplink delay information from a base station control server. The base station control server may be coupled to the digital unit. The base station control server may control associated base stations. The base station control server may collect information on repeaters and delay from associated base station and define the uplink delay information based on the collected information.

The uplink delay information may include first time information indicating a first time taken by the radio unit to analyze and process the second uplink signal, second time information indicating a second time taken by a signal travelling from the repeater to the radio unit, and third time information indicating a third time taken by the repeater to process a uplink signal received from the user equipment.

The uplink delay information $T_{uplink}$ may be expressed as: $T_{uplink}=\chi+\psi+\omega$, where $\chi$ may denote a time taken by the radio unit to analyze and process uplink signals received from the repeater, $\psi$ may denote a delay generated according to a distance between the radio unit and the repeater, and $\omega$ denotes a time taken by the repeater for processing an uplink signal received from the user equipment in order to transmit the uplink signal to the radio unit.

When the radio unit is connected to a plurality of repeaters, the uplink delay information may include first time information indicating a first time taken by the radio unit to analyze and process the first uplink signal, fourth time information indicating a fourth time taken by the second uplink signal traveling from a first repeater to the radio unit, fifth time information indicating a fifth time taken by each repeater including the first repeater to process the second uplink signal, and sixth time information indicating a sixth time taken by the second uplink signal traveling from one repeater to the other.

The uplink delay information may be expressed as: $T_{uplink}=\chi+(\psi_1+\ldots+\psi_n+(\omega_1+\ldots+\omega_n)$, where $\chi$ denotes a time taken by the radio unit to analyze and process uplink signals received from a repeater, n denotes the number of repeaters coupled to the radio unit, $\psi_n$ may denote delay according to a distance between $(n-1)^{th}$ repeater and $n^{th}$ repeater, and $\omega_1$ and $\omega_n$ denote a time taken by a corresponding repeater to process an uplink signal.

In accordance with another embodiment of the present invention, a method may be provided for processing a downlink signal in a radio unit in a remote cell. The method may include receiving downlink signals from a digital unit, transferring first downlink signals of the received downlink signals to a repeater, delaying transmission of second downlink signals of the received downlink signals directly to user equipment using downlink delay information, and transmitting the delayed second downlink signals directly to the user equipment.

The method may further include receiving the downlink delay information from a base station control server. The base station control server may be connected to the digital nit and control a base station. The base station control server may collect information on repeaters and delay from associated base station and define the downlink delay information based on the collected information.

The downlink delay information may include first time information indicating a first time taken by the radio unit to process the downlink signal received from the digital unit, second time information indicating a second time taken by a signal traveling from the radio unit to the repeater, and third time information indicating a third time taken by the repeater to process a downlink signal received from the radio unit.

The downlink delay information $T_{downlink}$ may be expressed as: $T_{downlink}=\alpha+\beta+\gamma$, where $\alpha$ denotes a time taken by the radio unit to process a downlink signal received from the digital unit, $\beta$ denotes a delay time according to a distance between the radio unit and the repeater, and $\gamma$ denotes a time taken by the repeater to process a downlink signal.

When the radio unit is coupled to a plurality of repeaters, the downlink delay information may include first time information indicating a first time taken by the radio unit to process a downlink signal received from the digital unit, fourth time information indicating a fourth time taken by a downlink signal for travelling from the radio unit to a first repeater, fifth time information indicating a fifth time taken by each of the plurality of repeaters including the first repeater to process the downlink signal, and sixth time information indicating a sixth time taken by a downlink signal for travelling from one repeater to the other.

The downlink delay information $T_{downlink}$ may be expressed as: $T_{downlink}=\alpha+(\beta_1+\ldots+\beta_n)$, wherein $\alpha$ denotes a time taken by the radio unit to process a downlink signal received from the digital unit to transmit to the repeater, n denotes the number of repeaters connected to the radio unit, $\beta_1$ denotes a time taken by a downlink signal propagating from the radio unit to a first repeater, $\beta_n$ denotes a time taken by a downlink signal propagating from $(n-1)^{th}$ repeater to $n^{th}$ repeater, and $\gamma_1, \ldots, \gamma_n$ denote a time taken by each repeater to process a downlink signal to transmit to the user equipment.

In accordance with still another embodiment of the present invention, a radio unit may be located in a base station of a virtual radio network and connected to at least one repeater. The radio unit may include a receiver, a delay unit, a combiner, and a transmitter. The receiver may be configured to receive first uplink signals from user equipment, to receive second uplink signal from the at least one repeater, and to receive downlink signals from a digital unit. The delay unit may be configured to receive uplink delay information and downlink delay information, to delay the first uplink signal using the uplink delay information, and to delay first downlink signals of the received downlink signals using the downlink delay information. The combiner may be configured to combine the delayed first uplink signal with the second uplink signal. The transmitter may be configured to transmit the combined uplink signal to the digital unit, to transmit the delayed first downlink signal directly to the user equipment, and to transmit a second downlink signal of the received downlink signals to the at least one repeater.

The delay unit may receive the uplink delay information and the downlink delay information from a base station control server. The base station control server may be connected to the digital unit and control a base station. The base station control server may collect information on repeaters and delay from associated base station and define the downlink delay information and the uplink delay information based on the collected information.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
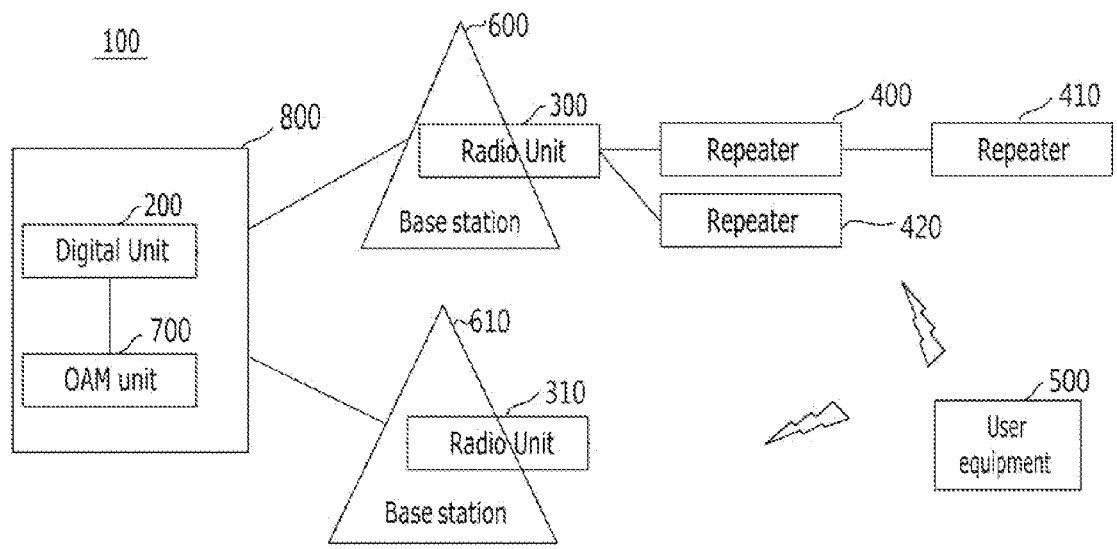
FIG. 1 shows a virtual radio network in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

FIG. 1 shows a virtual radio network in accordance with embodiments of the present invention.

Referring to FIG. 1, virtual radio network 100 may include digital unit 200 located in digital unit center 800, radio units 300 and 310 located in respective base stations 600 and 610, a plurality of repeaters 400, 410, and 420, operation, administration, and management (OAM) unit 700, and user equipment 500. Unlike a typical network, virtual radio network 100 may include digital unit 200 and radio units 300 and 310 separated and installed at different locations. Virtual radio network 100 may be referred as a cloud communication center network. For example, radio units 300 and 310 may be installed at respective base stations 600 and 610. Digital unit 200 may be centralized in digital unit center 800. Digital unit center 800 may be installed at a central office with a switching system (not shown).

Digital unit 200 may receive signals from radio units 300 and 310 and process the received signals. For example, digital unit 200 may encrypt and decrypt the received signals. The received signals may be a radio digital signal generated based on with $3^{rd}$ generation partnership project (3GPP), worldwide interoperability for microwave access (WiMAX), Wireless Broadband (WiBro), and/or long term evolution (LTE), but the present invention is not limited thereto. As described, digital unit 200 may be separated from base stations 600 and 610 and installed at digital unit center 800 in virtual radio network 100. The present invention, however, is not limited thereto. Digital unit 200 may be included in base stations 600 and 610 with respective radio units 300 and 310. Digital unit 200 may be coupled to corresponding radio units 300 and 310 through an optical interface, but the present invention is not limited thereto.

Radio units 300 and 310 may receive signals from digital unit 200, process the received signals, and transmit the processed signal directly to user equipment 500 or indirectly to user equipment 500 through coupled repeaters 400, 410, and 420. Furthermore, radio units 300 and 310 may receive signals directly from user equipment 500 or indirectly from user equipment 500 through coupled repeaters 400, 410, and 420, process the received signals, and transmit the processed signals to digital unit 200. In general, radio units 300 and 310 may be a set of elements for processing a radio frequency signal. For example, radio units 300 and 310 may convert digital signals from digital unit 200 to a radio frequency signal according to a frequency band, amplify the RF signal, and transmit the RF signal through antennas (not shown). Accordingly, radio units 300 and 310 may include a converter and an amplifier.

Radio units 300 and 310 may be installed at corresponding base stations 600 and 610, separated from digital unit 200, in virtual radio network 100. Generally, a radio unit may be coupled to a repeater and receive and transmit signals through the coupled repeater. For example, radio unit 300 may be coupled to multiple repeaters 400, 410, and 420. Some repeaters 400 and 420 may be coupled in a cascade manner. Such repeaters 400, 410, and 420 may deliver signals from user equipment to the radio unit and/or from the radio unit to the user equipment. Alternatively, a radio unit may be not coupled to a repeater. For example, radio unit 320 may be not coupled to the repeater. In this case, radio unit 320 may transmit and receive signals directly to or from user equipment 500.

In accordance with embodiments of the present invention, radio unit 300 may delay a signal directly received from user equipment 500 based on information on repeaters 400, 410, and 420 coupled thereto for an uplink from user equipment 500 to digital unit 200. Furthermore, radio unit 300 may delay a signal received from digital unit 200 based on information on repeaters 400, 410, and 420 coupled thereto for a downlink from digital unit 200 to user equipment 500. In this manner, related signals may arrive at a destination unit within one cyclic prefix, so as to prevent inter-carrier interference and inter-symbol interference. The destination unit may be digital unit 200 for the uplink and user equipment 500 for the downlink.

Repeaters 400, 410, and 420 may be connected to corresponding radio unit 300. Repeaters 400, 410, and 420 may deliver signals between radio unit 300 and user equipment 500 and between coupled repeaters, for example, between repeater 400 and 410.

Operation, administration, and management (OAM) unit 700 may be coupled to digital unit 200 and control and manage operations of base stations 600 and 610. OAM unit 700 may be referred to as a base station control server. OAM unit 700 may collect information related to repeaters 400, 410, and 420 and delay from base stations 600 and 610. Based on the collected information, OAM unit 700 may determine uplink delay information and downlink delay information and provide the determined uplink delay information and the downlink delay information to radio units 300 and 310.

Hereinafter, delaying related signals in accordance with embodiments of the present invention will be described with reference to FIG. 2 to FIG. 10. Such operation in a downlink will be described with reference to FIG. 2 to FIG. 5.

Figure 2:
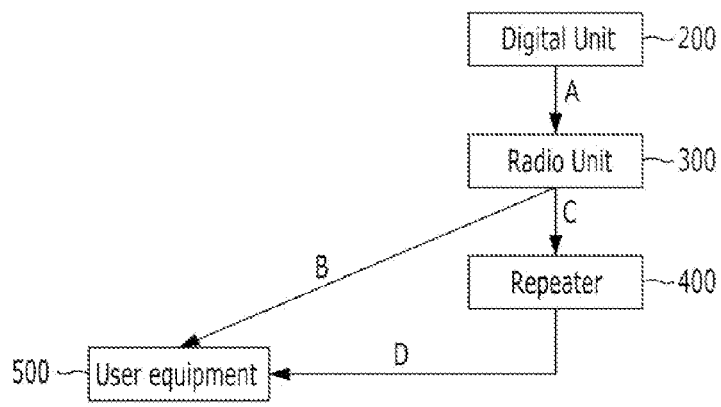
FIG. 2 shows a downlink signal path in accordance with embodiments of the present invention.

FIG. 2 shows a downlink signal path in accordance with embodiments of the present invention.

Referring to FIG. 2, a downlink signal path with one repeater 400 may be illustrated. The downlink signal path may denote a signal path from digital unit 200 to user equipment 500. As shown, user equipment 500 may receive related signals from digital unit 200 through two signal paths, a first downlink signal path (A→B) and a second downlink signal path (A→C→D). For example, user equipment 500 may receive first signals directly from radio unit 300 through the first downlink signal path (A→B) or receive second signals indirectly from radio unit 300 through repeater 400, which is the second d signal path (A→C→D). Such first and second signals may be required to arrive at user equipment 500 within one cyclic prefix in order to enable user equipment 500 to synchronize the received signals.

In OFDM, inter-carrier interference and inter-symbol interference may be generated because related signals are transmitted and received through a plurality of signal paths, known as multipath propagation. In order to prevent such the inter-carrier interference and the inter-symbol interference, a guard interval is added between active symbol periods and a cyclic prefix is transmitted during the guard interval. If related signals arrived at a destination unit within one CP difference, inter-carrier interference and inter-symbol interference are not generated allowing restoration of an original signal based on the received signals.

In accordance with embodiments of the present invention, radio unit 300 may delay transmission of signals received from digital unit 200 until repeater 400 is ready to transmit related signals to user equipment 500. In this manner, user equipment 500 may be enabled to synchronize the signals received from digital unit 200 through the first signal path and the second signal path.

Figure 3:
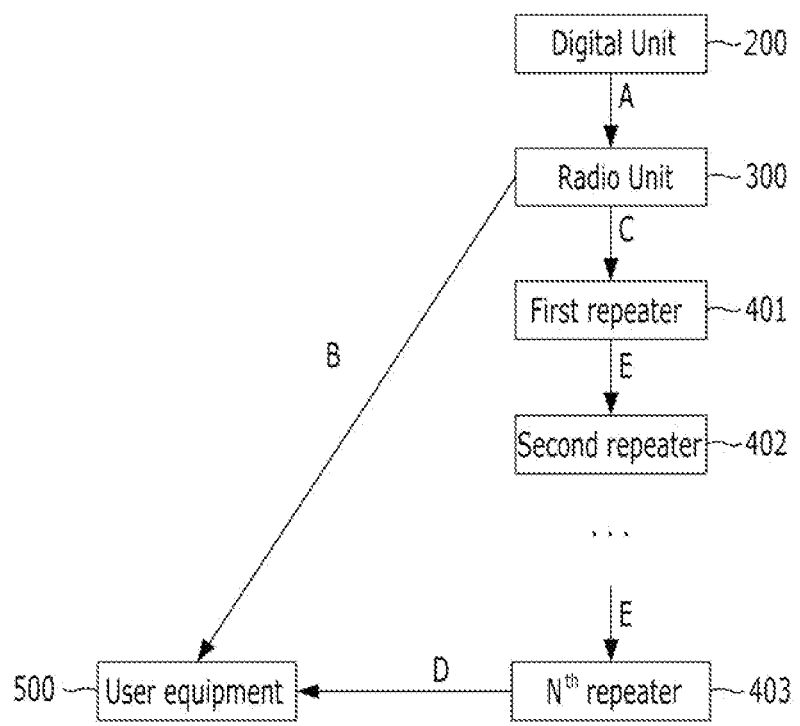
FIG. 3 shows a downlink signal path in accordance with another embodiment of the present invention.

FIG. 3 shows a downlink signal path in accordance with another embodiment of the present invention.

Referring to FIG. 3, a downlink signal path with multiple repeaters 401, 402, and 403 is illustrated. As shown, user equipment 500 may receive signals directly from radio unit 300 through a first signal path (A→B) and signals indirectly from radio unit 300 through a third signal path (A→C→E→D), for example, through multiple repeaters 401 to 403.

Unlike the second signal path of FIG. 2, the third signal path (A→C→E→D) may be formed when multiple repeaters are coupled in a cascade manner. That is, signal paths from one repeater to another may be added in the third signal path.

Similar to FIG. 2, radio unit 300 may delay transmission of signals received from digital unit 200 until last repeater 403 is ready to transmit signals to user equipment 500 in accordance with embodiments of the present invention. In this manner, user equipment 500 may be enabled to synchronize the signals received from digital unit 200 through the first downlink signal path and the third downlink signal path.

Figure 4:
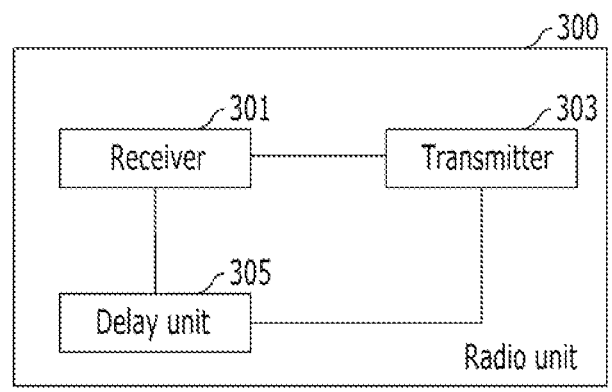
FIG. 4 shows a radio unit for delaying a downlink signal based on information on repeaters coupled thereto in accordance with embodiments of the present invention.

FIG. 4 shows a radio unit for delaying a downlink signal based on information on repeaters coupled thereto in accordance with embodiments of the present invention.

Referring to FIG. 4, radio unit 300 may include receiver 301, transmitter 303, and delay unit 305. Receiver 301 may receive downlink delay information from OAM unit 700 and transfer the received downlink information to delay unit 305. Receiver 301 may receive signals from digital unit 200.

Transmitter 303 may transmit signals received from digital unit 200 distributedly through multiple paths. For example, transmitter 303 may transmit the received signals to repeater 400 connected to radio unit 300 without delaying. Furthermore, transmitter 303 may transmit the delayed signal directly to user equipment 500.

Delay unit 305 may receive downlink delay information from OAM unit 700 (FIG. 1) through receiver 301. Delay unit 305 may delay transmission of signals directly to user equipment 500 based on the received downlink delay information. Such operation will be described in more detail with reference to FIG. 5.

Figure 5:
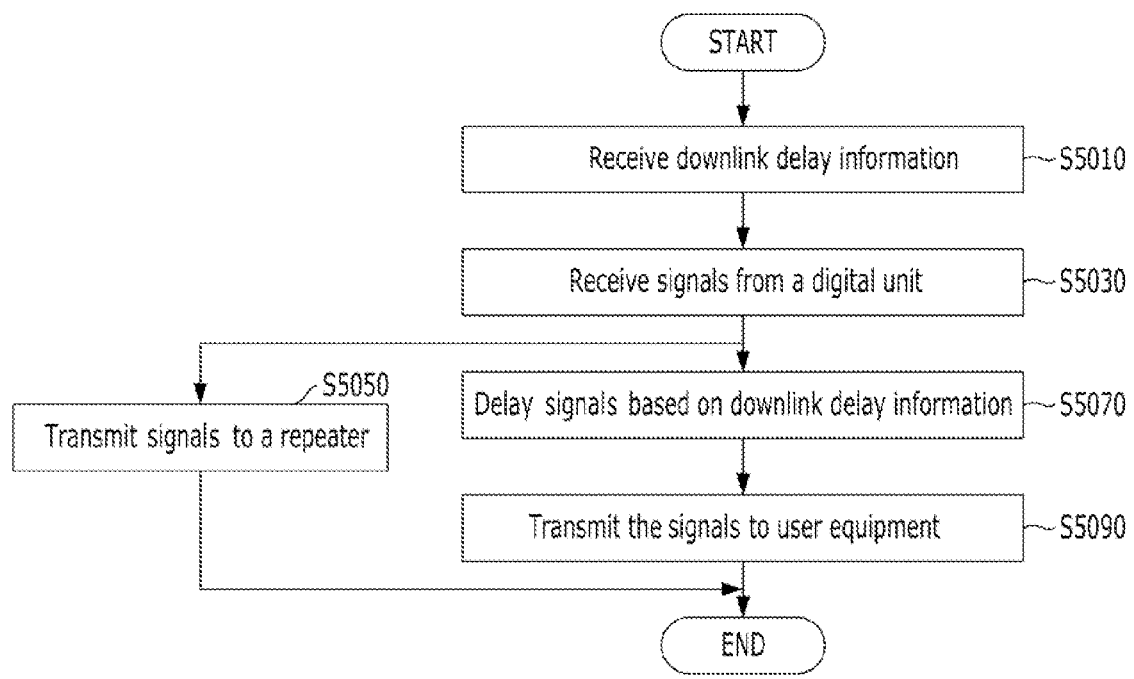
FIG. 5 shows a method for delaying a downlink signal based on coupled repeaters in a radio unit in accordance with embodiments of the present invention.

FIG. 5 shows a method for delaying a downlink signal based on coupled repeaters in a radio unit in accordance with embodiments of the present invention.

Referring to FIG. 5, downlink delay information may be received at step S5010. For example, receiver 301 of radio unit 300 may receive may receive the downlink delay information $T_{downlink}$ from OAM unit 700 and pass the received downlink delay information $T_{downlink}$ to delay unit 305. OAM unit 700 may collect repeater information and delay information from base stations 600 and 610 and estimate delay between adjacent repeaters or from radio unit 300 to repeater coupled to radio unit 300. QAM unit 700 may provide such downlink delay information may to radio unit 300.

At step S5030, signals may be received from a digital unit. For example, receiver 301 of radio unit 300 may receive signal from digital unit 200.

At step S5050, the received signals may be transmitted to a repeater connected thereto upon the receipt of the signals from digital unit 200. For example, transmitter 303 of radio unit 300 may distributedly transmit the received signal to user equipment 500 through multiple paths, for example, directly to user equipment 500 and through repeater 400. Accordingly, transmitter 303 may transmit predetermined signals of the received signals to user equipment 500 through repeater 400 connected to radio unit 300 at step S5050.

At step S5070, signals may be delayed based on the received downlink delay information $T_{downlink}$. For example, delay unit 305 may delay transmission of predetermined signals of the received signals directly to user equipment 500 based on the received downlink delay information $T_{downlink}$. The direct transmission of such predetermined signals to user equipment 500 may be delayed until repeater 400 is ready to send the signals received from radio unit 300 to user equipment 500.

At step S5090, the delayed signals may be transmitted directly to user equipment. For example, transmitter 303 may transmit the delayed signals directly to user equipment 500 after a time passed based on the downlink delay information $T_{downlink}$.

When one repeater is included in a virtual radio network as shown in FIG. 2, the downlink delay information $T_{downlink}$ may be expressed as Eq. 1 below.

$$T_{downlink} = \alpha + \beta + \gamma \qquad \text{Eq. 1}$$

In Eq. 1, $\alpha$ may denote a time taken by radio unit 300 for processing a downlink signal received from digital unit 200 to transmit to repeater 400. $\beta$ may denote a delay time according to a distance between radio unit 300 to one repeater 400. That is, $\beta$ may denote a time taken by one repeater 400 for receiving a signal transmitted from radio unit 300 after transmitting the signal from radio unit 300. $\beta$ may be set as T/2 where T is a traveling time of a signal transmitted from radio unit 300 to repeater 400 and then returned to radio unit 300. $\gamma$ may denote a time taken by repeater 400 for processing a downlink signal to transmit to user equipment 500 after receiving the downlink signal from radio unit 300.

When a plurality of repeaters are included in a virtual radio network as shown in FIG. 3, the downlink delay information $T_{downlink}$ may be expressed as Eq. 2 below.

$$T_{downlink} = \alpha + (\beta_1 + \ldots + \beta_n) + (\gamma_1 + \ldots + \gamma_n) \qquad \text{Eq. 2}$$

In Eq. 2, the value $\alpha$ may denote a time taken by radio unit 300 for processing a downlink signal received from digital unit 200 to transmit to repeater 400 after receiving the signal from digital unit 200. The value n denotes the number of repeaters included in a virtual radio network. The value $\beta$ may denote a delay time according to a distance between radio unit 300 to one repeater 400 or between two adjacent repeaters. That is, $\beta_1$ may denote a time taken by a downlink signal propagating from radio unit 300 to first repeater 400. The value $\beta_n$ may denote a time taken by a downlink signal propagating from $(n-1)^{th}$ repeater to $n^{th}$ repeater. The value $\beta_n$ may be set as T/2 where T is a traveling time of a signal transmitted from one repeater to neighbor repeater and then returned back to the repeater. Such measurement and determination may be performed by OAM 200 by collecting related information from base stations. The values $\gamma_1 \ldots \gamma_n$ may denote a time taken by each repeater for processing a downlink signal to transmit to user equipment 500 after receiving the downlink signal from radio unit 300.

Hereinafter, delaying related signals in an uplink in accordance with embodiments of the present invention will be described with reference to FIG. 6 to FIG. 10.

Figure 6:
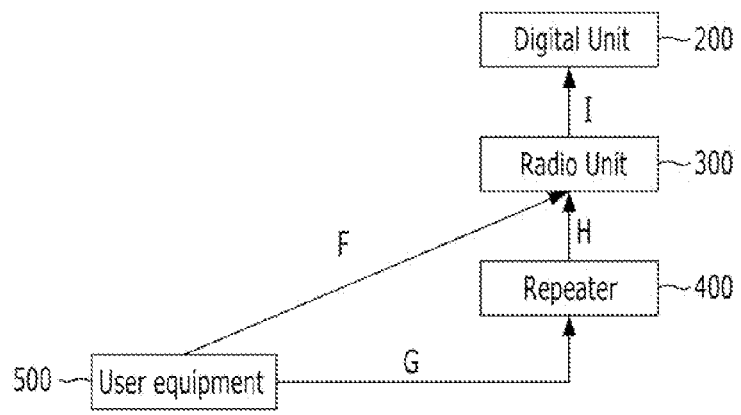
FIG. 6 shows an uplink signal path in accordance with embodiments of the present invention.

FIG. 6 shows an uplink signal path in accordance with embodiments of the present invention.

Referring to FIG. 6, an uplink signal path with one repeater 400 may be illustrated. The uplink signal path may denote a signal path from user equipment 500 to digital unit 200. As shown, user equipment 500 may transmit signals to digital unit 200 through a fourth signal path (F→I) and a fifth signal path (G→H→I).

Radio unit 300 may combine first uplink signals received directly from user equipment 500 through the fourth signal path and second uplink signals received from repeater 400 through the fifth signal path. Radio unit 300 may transmit the combined signal to digital unit 200.

Figure 7:
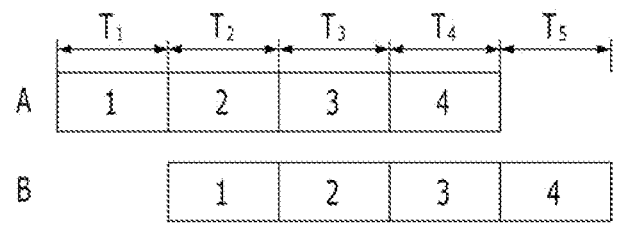
FIG. 7 shows synchronization offset between uplink signals in accordance with embodiments of the present invention.

The first uplink signals and the second uplink signals may arrive at different timings due to delay generated by repeater 400 as shown in FIG. 7. That is, there is an offset in signal synchronization when radio unit 300 receives the first uplink signals and the second uplink signals. Accordingly, radio unit 300 may have difficulty in combining the first and second uplink signals.

FIG. 7 shows synchronization offset between uplink signals in accordance with embodiments of the present invention.

Referring to FIG. 7, "A" may denote a sequence of signals received directly from user equipment 500. As shown, radio unit 300 may receive first signal 1, second signal 2, third signal 3, and fourth signal 4 of signal sequence A at time $T_1$, $T_2$, $T_3$, and $T_4$, respectively. "B" may denote a sequence of signals received indirectly from user equipment 500 through repeater 400. Due to repeater 400, the sequence B of signals may arrive with delay $T_1$. Accordingly, radio unit 300 may receive first signal 1, second signal 2, third signal 3, and fourth signal 4 of the signal sequence B at time $T_2$, $T_3$, $T_4$, and $T_5$, respectively.

When radio unit 300 combines the first sequence signals A and the second sequence signals B, radio unit 300 may combine second signal 2 of first sequence A with first signal 1 of second sequence B, thereby generating errors.

Accordingly, radio unit 300 may delay the first sequence signals A until the second sequence signals B arrive at radio unit 300. For example, radio unit 300 may delay first signal 1 of first signal sequence A until time $T_2$.

Figure 8:
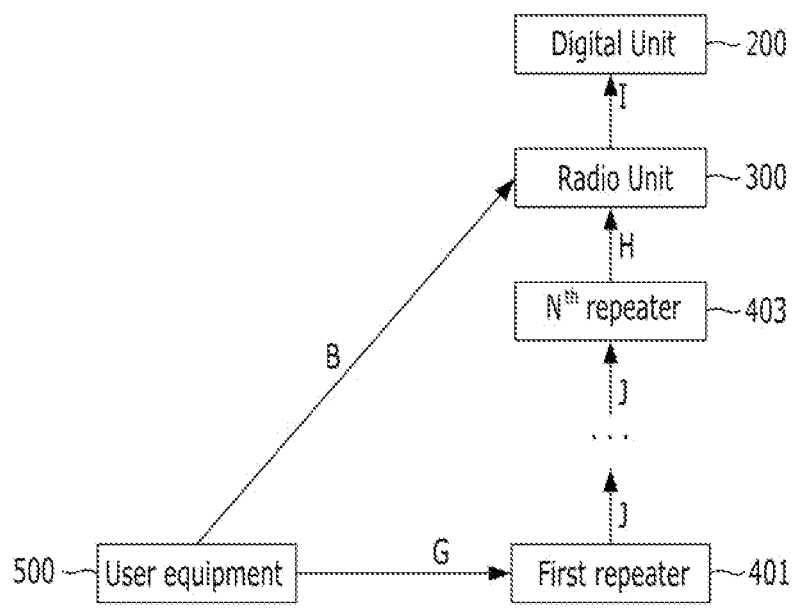
FIG. 8 shows an uplink signal path in accordance with another embodiment of the present invention.

FIG. 8 shows an uplink signal path in accordance with another embodiment of the present invention.

Referring to FIG. 8, an uplink signal path with multiple repeaters 401 to 403 may be illustrated. As shown, user equipment 500 may transmit a signal to digital unit 200 distributedly through a fourth signal path (F→I) and a sixth signal path (G→J=H→I).

Unlike FIG. 7, the sixth signal path (G→J→H→I) may additionally include signal paths J between a repeater to a neighbor repeater. Similar to FIG. 7, radio unit 300 may delay a first signal received directly from user equipment 500 through the fourth signal path until receiving a second signal received from the last repeater included in the sixth signal path.

Figure 9:
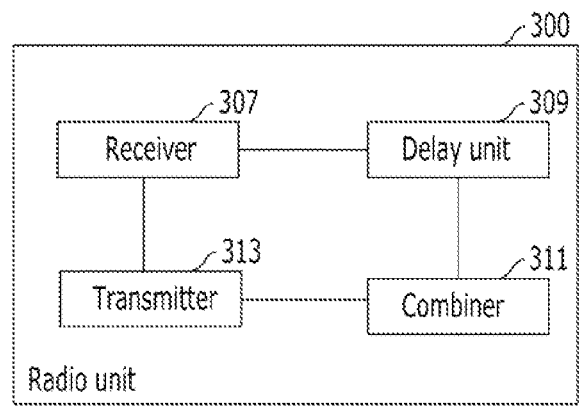
FIG. 9 shows a radio unit for delaying an uplink signal based on coupled repeaters in accordance with embodiments of the present invention.

FIG. 9 shows a radio unit for delaying an uplink signal based on coupled repeaters in accordance with embodiments of the present invention.

Referring to FIG. 9, radio unit 300 may include receiver 307, delay unit 309, combiner 311, and transmitter 313. Receiver 307 may receive uplink delay information from OAM unit 700 and deliver the received uplink delay information to delay unit 309. Receiver 307 may receive first signals from user equipment 500 and second signals from repeater 400.

Delay unit 309 may receive the uplink delay information through receiver 307 from OAM unit 700. Delay unit 309 may delay the first signals received from user equipment 500 based on the received uplink delay information.

Combiner 311 may combine the delayed first signals with the second signals received from repeater 400. Transmitter 313 may transmit the combined signals to digital unit 200.

Figure 10:
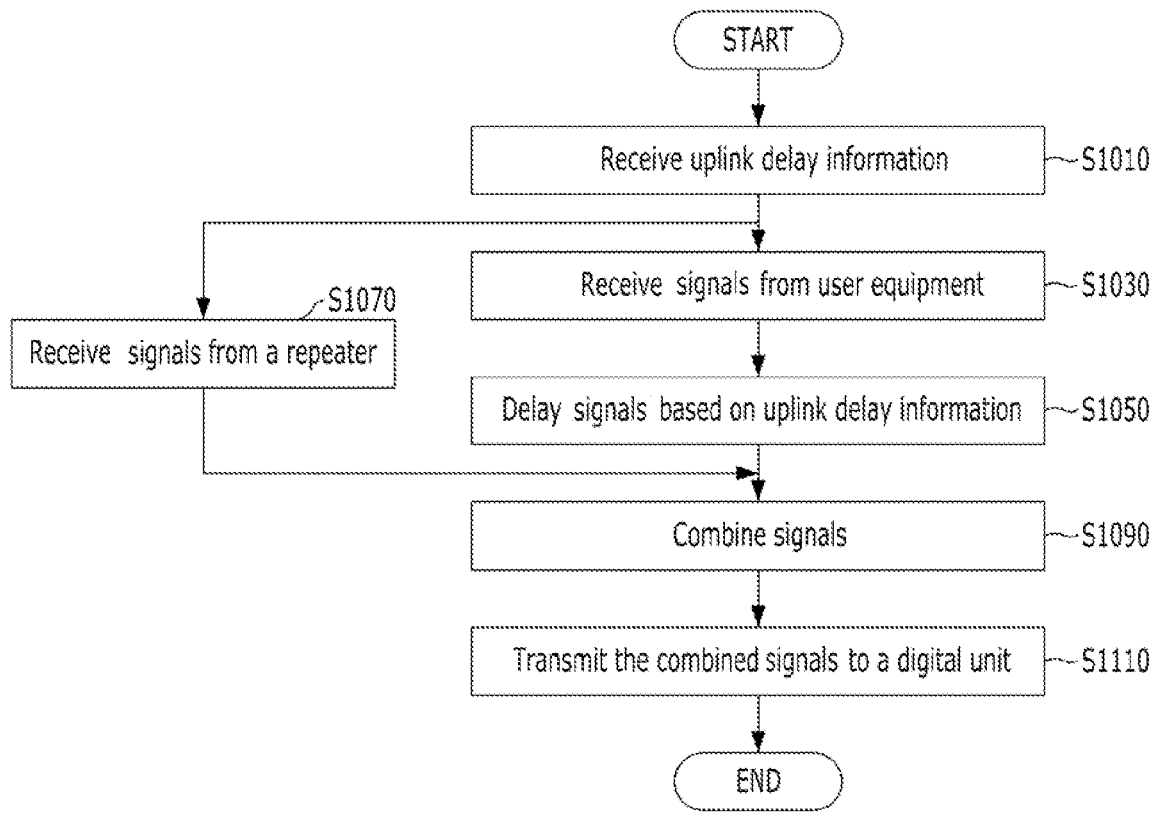
FIG. 10 shows a method for delaying an uplink signal based on coupled repeaters in a radio unit in accordance with embodiments of the present invention.

FIG. 10 shows a method for delaying an uplink signal based on coupled repeaters in a radio unit in accordance with embodiments of the present invention.

Referring to FIG. 10, uplink delay information may be received at step S1010. For example, receiver 307 of radio unit 300 may receive uplink delay information $T_{uplink}$ from OAM unit 700 and deliver the received uplink delay information $T_{uplink}$ to delay unit 309.

At step S1030, first signals may be received from user equipment. For example, receiver 307 of radio unit 300 may receive first signals directly from user equipment 500 through the fourth signal path. At step S1050, the received signal may be delayed based on the received uplink delay information. For example, delay unit 309 may delay the received first signals based on the received uplink delay information $T_{uplink}$.

At step S1070, second signals may be received from a repeater. For example, receiver 307 may receive second signals from repeater 400. That is, receiver 307 may receive the second signals from user equipment 500 through repeater 400, that is, through the fifth signal path or the sixth signal path. At step S1090, the first signals and the second signals may be combined. For example, combiner 311 of radio unit 300 may combine the first signals and the second signals. At step S1100, the combined signal may be transmitted to a digital unit. For example, transmitter 313 may transmit the combined signal to digital unit 200.

When a single repeater is included in a virtual radio network as shown in FIG. 6, the uplink delay information $T_{uplink}$ may be expressed as Eq. 3 below.

$$T_{uplink} = \chi + \psi + \omega \qquad \text{Eq. 3}$$

In Eq. 3, $\chi$ may denote a time taken by radio unit 300 to analyze and process uplink signals received from repeater 400 in order to combine. The value $\psi$ may denote a delay according to a distance between radio unit 300 and repeater 400. That is, $\psi$ may denote a time taken by a signal propagating from repeater 400 to radio unit 300. The value $\psi$ may be set as T/2 where T is a traveling time of a signal traveling from radio unit 300 to repeater 400 and then returning back to radio unit 300. It may be measured and set by OAM unit 700. The value $\omega$ may denote a time taken by repeater 400 for processing an uplink signal received from user equipment 500 in order to transmit the uplink signal to radio unit 300.

When multiple repeaters are included in a virtual radio network as shown in FIG. 8, the uplink delay information $T_{uplink}$ may be expressed as Eq. 4 below.

$$T_{uplink} = \chi + (\psi_1 + \ldots + \psi_n) + (\omega_1 + \ldots + \omega_n) \qquad \text{Eq. 4}$$

In Eq. 4, $\chi$ may denote a time taken by radio unit 300 to analyze and process uplink signals received from repeater 400 in order to combine. The value n may denote the number of repeaters included in a virtual radio network. The value $\psi$ may denote a delay according to a distance between radio unit 300 and repeater 400 and between two adjacent repeaters 401 and 402. The value $\psi_1$ may denote delay according to a distance between radio unit 300 and first repeater 400. The value $\psi_n$ may denote delay according to a distance between $(n-1)^{th}$ repeater and $n^{th}$ repeater. That is, $\psi_n$ may denote a time taken by a signal travelling from $(n-1)^{th}$ repeater to $n^{th}$ repeater. The value $\psi_n$ may be set as T/2 where T is a traveling time of a signal travelling from a first repeater to a neighbor repeater and then returning back to the first repeater. It may be measured and set by OAM unit 700. The values $\omega_1$ and $\omega_n$ may denote a time taken by a corresponding repeater for processing an uplink signal.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for processing an uplink signal, the method comprising:
   receiving a first uplink signal directly from user equipment;
   delaying the received first uplink signal by using uplink delay information;
   receiving a second uplink signal indirectly from user equipment through at least one repeater connected to a radio unit;
   combining the delayed first uplink signal and the second uplink signal; and
   transmitting the combined signal to a digital unit.

2. The method of claim 1, further comprising:
receiving the uplink delay information from a base station control server,
wherein the base station control server is coupled to the digital unit and controls associated base stations.

3. The method of claim 2, wherein the base station control server collects information on repeaters and delays from an associated base station and defines the uplink delay information based on the collected information.

4. The method of claim 1, wherein: the uplink delay information $T_{uplink}$ is expressed as: $T_{uplink} = \chi + \psi + \omega$, where $\chi$ denotes a time taken by the radio unit to analyze and process uplink signals received from the repeater, $\psi$ denotes a delay generated according to a distance between the radio unit and the repeater, and $\omega$ denotes a time taken by the repeater for processing an uplink signal received from the user equipment in order to transmit the uplink signal to the radio unit.

5. The method of claim 1, wherein when the radio unit is connected to a plurality of repeaters, the uplink delay information includes:
first time information indicating a first time taken by the radio unit to analyze and process the first uplink signal;
fourth time information indicating a fourth time taken by the second uplink signal traveling from a first repeater to the radio unit;
fifth time information indicating a fifth time taken by each repeater including the first repeater to process the second uplink signal; and
sixth time information indicating a sixth time taken by the second uplink signal traveling from one repeater to the other.

6. The method of claim 5, wherein the uplink delay information is expressed as: $T_{uplink} = \chi + (\psi_1 + \ldots + \psi_n) + (\omega_1 + \ldots + \omega_n)$, where $\chi$ denotes a time taken by the radio unit to analyze and process uplink signals received from a repeater, n denotes the number of repeaters coupled to the radio unit, $\psi_n$ denotes delay according to a distance between $(n-1)^{th}$ repeater and $n^{th}$ repeater, and $\omega_1$ and $\omega_n$ denote a time taken by a corresponding repeater to process an uplink signal.

7. A method for processing a downlink signal in a radio unit in a remote cell, the method comprising:
receiving downlink signals from a digital unit;
transferring first downlink signals of the received downlink signals to a repeater;
delaying transmission of second downlink signals of the received downlink signals directly to user equipment using downlink delay information; and
transmitting the delayed second downlink signals directly to the user equipment.

8. The method of claim 7, wherein the downlink delay information includes:
first time information indicating a first time taken by the radio unit for processing the downlink signal received from the digital unit;
second time information indicating a second time taken by a signal traveling from the radio unit to the repeater; and
third time information indicating a third time taken by the repeater for processing a downlink signal received from the radio unit.

9. The method of claim 8, wherein the downlink delay information $T_{downlink}$ is expressed as: $T_{downlink} = \alpha + \beta + \gamma$, where $\alpha$ denotes a time taken by the radio unit for processing a downlink signal received from the digital unit, $\beta$ denotes a delay time according to a distance between the radio unit and the repeater, and $\gamma$ denotes a time taken by the repeater for processing a downlink signal to transmit to the user equipment.

10. The method of claim 7, wherein when the radio unit is connected to a plurality of repeaters, the downlink delay information includes:
first time information indicating a first time taken by the radio unit for processing a downlink signal received from the digital unit;
fourth time information indicating a fourth time taken by a downlink signal for travelling from the radio unit to a first repeater;
fifth time information indicating a fifth time taken by each of the plurality of repeaters including the first repeater for processing the downlink signal; and
sixth time information indicating a sixth time taken by a downlink signal for travelling from one repeater to the other.

11. The method of claim 10, wherein the downlink delay information $T_{downlink}$ is expressed as: $T_{downlink} = \alpha + (\beta_1 + \ldots + \beta_n) + (\gamma_1 + \ldots + \gamma_n)$, wherein $\alpha$ denotes a time taken by the radio unit for processing a downlink signal received from the digital unit to transmit to the repeater, n denotes the number of repeaters connected to the radio unit, $\beta_1$ denotes a time taken by a downlink signal propagating from the radio unit to a first repeater, $\beta_n$ denotes a time taken by a downlink signal propagating from $(n-1)^{th}$ repeater to $n^{th}$ repeater, and $\gamma_1, \ldots, \gamma_n$ denote a time taken by each repeater for processing a downlink signal to transmit to the user equipment.

12. A radio unit located in a base station of a virtual radio network and connected to at least one repeater, the radio unit comprising:
a receiver configured to receive first uplink signals from user equipment, to receive second uplink signal from the at least one repeater, and to receive downlink signals from a digital unit;
a delay unit configured to receive uplink delay information and downlink delay information, to delay the first uplink signal using the uplink delay information, and to delay first downlink signals of the received downlink signals using the downlink delay information;
a combiner configured to combine the delayed first uplink signal with the second uplink signal;
a transmitter configured to transmit the combined uplink signal to the digital unit, to transmit the delayed first downlink signal directly to the user equipment, and to transmit a second downlink signal of the received downlink signals to the at least one repeater.

13. The radio unit of claim 12, wherein the uplink delay information is expressed as: $T_{uplink} = \chi + (\psi_1 + \ldots + \psi_n) + (\omega_1 + \ldots + \omega_n)$, where $\chi$ denotes a time taken by the radio unit to analyze and process uplink signals received from a repeater, n denotes the number of repeaters coupled to the radio unit, $\psi_n$ denotes delay according to a distance between $(n-1)^{th}$ repeater and $n^{th}$ repeater, and $\omega_1$ and $\omega_n$ denote a time taken by a corresponding repeater for processing an uplink signal.

14. The radio unit of claim 12, wherein when the radio unit is connected to a plurality of repeaters, the downlink delay information includes:
fifth time information indicating a fifth time taken by the radio unit to process a downlink signal received from the digital unit;
sixth time information indicating a sixth time taken by a downlink signal to travel from the radio unit to a first repeater coupled to the radio unit;
seventh time information indicating a seventh time taken by each repeater to process the downlink signal; and
eighth time information indicating an eighth time taken by a downlink signal to travel from one repeater to the other.

15. The radio unit of claim 14, wherein the downlink delay information $T_{downlink}$ is expressed as: $T_{downlink} = \alpha + (\beta_1 + \ldots + \beta_n) + (\gamma_1 + \ldots + \gamma_n)$, wherein $\alpha$ denotes a time taken by the radio unit for processing a downlink signal received from the digital unit to transmit to the repeater, n denotes the number of repeaters connected to the radio unit, $\beta_1$ denotes a time taken by a downlink signal propagating from the radio unit to a first repeater, $\beta_n$ denotes a time taken by a downlink signal propagating from $(n-1)^{th}$ repeater to $n^{th}$ repeater, and $\gamma_1, \ldots, \gamma_n$ denote a time taken by each repeater to process a downlink signal to transmit to the user equipment.

16. The radio unit of claim 12, wherein:
the delay unit receives the uplink delay information and the downlink delay information from a base station control server;
the base station control server is coupled to the digital unit and controls a base station; and the base station control server collects information on repeaters and delays from associated base station and defines the downlink delay information and the uplink delay information based on the collected information.

\* \* \* \* \*